(12) United States Patent
Mastrocola

(10) Patent No.: US 11,015,661 B2
(45) Date of Patent: *May 25, 2021

(54) ROTATABLE ELECTROMAGNETIC CLUTCH UTILIZING INDUCTIVE COUPLING

(71) Applicant: Hamilton Sundstrand Corporation, Charlotte, NC (US)

(72) Inventor: Naison E. Mastrocola, Goshen, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 244 days.

This patent is subject to a terminal disclaimer.

(21) Appl. No.: 15/963,289

(22) Filed: Apr. 26, 2018

(65) Prior Publication Data

US 2019/0331174 A1     Oct. 31, 2019

(51) Int. Cl.
*F16D 27/09*      (2006.01)
*F16D 11/14*      (2006.01)
(Continued)

(52) U.S. Cl.
CPC .............. *F16D 27/09* (2013.01); *F16D 11/14* (2013.01); *F16D 27/14* (2013.01); *H02K 49/06* (2013.01);
(Continued)

(58) Field of Classification Search
CPC .......... F16D 27/02; F16D 27/04; F16D 27/06; F16D 27/09; F16D 27/14;
(Continued)

(56) References Cited

U.S. PATENT DOCUMENTS 2,883,873  A     4/1959   Diebold
4,329,603  A  *  5/1982   Ballard ............... H02K 11/042
                                                      310/54
(Continued)

FOREIGN PATENT DOCUMENTS

CN        2338493 Y     9/1999
CN      201103636 Y     8/2008
(Continued)

OTHER PUBLICATIONS

Xianzhong Fang. Espacenet Machine Translation of CN201103636. Aug. 20, 2008. (Year: 2008).*

(Continued)

*Primary Examiner* — Charles A Fox
*Assistant Examiner* — Lori Wu
(74) *Attorney, Agent, or Firm* — Carlson, Gaskey & Olds, P.C.

(57) ABSTRACT

An example electromagnetic clutch assembly includes a rotatable portion and a stationary portion. The rotatable portion includes a field winding and a clutch body, and the stationary portion includes an exciter winding that is inductively coupled to the rotatable portion and is operable to (Continued)

energize the field winding. The field winding is operable, when energized, to provide a magnetic field that causes engagement or disengagement between the clutch body and an armature body. A method of operating an electromagnetic clutch assembly is also disclosed.

15 Claims, 4 Drawing Sheets

(51) Int. Cl.
*F16D 27/14* (2006.01)
*H02K 49/06* (2006.01)
*F16D 27/00* (2006.01)

(52) U.S. Cl.
CPC .. *F16D 2027/002* (2013.01); *F16D 2027/008* (2013.01); *F16D 2500/10475* (2013.01); *F16D 2500/30401* (2013.01)

(58) Field of Classification Search
CPC ......... F16D 2027/001; F16D 2027/002; F16D 2027/008; F16D 11/14; F16D 2500/10475; F16D 2500/30401; H02K 49/06

See application file for complete search history.

(56) References Cited

U.S. PATENT DOCUMENTS

| | | |
|---|---|---|
| 4,559,486 A | 12/1985 | Spencer et al. |
| 4,682,676 A * | 7/1987 | Murata ................... F16D 37/02 |
| | | 192/21.5 |
| 2007/0108854 A1 | 5/2007 | Osborn et al. |
| 2013/0256078 A1* | 10/2013 | Kimes ................... F16D 41/125 |
| | | 192/69 |

FOREIGN PATENT DOCUMENTS

| | | |
|---|---|---|
| CN | 104006153 A | 8/2014 |
| WO | 0023292 A1 | 4/2000 |

OTHER PUBLICATIONS

European Search Report for European Patent Application No. 19171439.3, completed Sep. 4, 2019.

* cited by examiner

ROTATABLE ELECTROMAGNETIC CLUTCH UTILIZING INDUCTIVE COUPLING

BACKGROUND

This application relates to clutches, and more particularly to a rotatable electromagnetic clutch utilizing inductive coupling.

Clutches are used to selectively couple a drive shaft to a load shaft to drive a load. A common application for a clutch is selectively coupling a vehicle engine to a transmission to transmit driving torque to wheels of the vehicle, for example.

Electromagnetic clutches utilize an electromagnetic field to cause a clutch plate to engage or disengage from an armature coupled to the load shaft. In a typical configuration, direct current (DC) is provided to an electromagnetic coil, which creates a magnetic field causing the armature to engage a clutch plate. DC is typically provided to the electromagnetic coil through brushes. Brushes are subject to wear and are therefore considered unreliable for certain applications.

SUMMARY

An example electromagnetic clutch assembly includes a rotatable portion and a stationary portion. The rotatable portion includes a field winding and a clutch body, and the stationary portion includes an exciter winding that is inductively coupled to the rotatable portion and is operable to energize the field winding. The field winding is operable, when energized, to provide a magnetic field that causes engagement or disengagement between the clutch body and an armature body.

An example method of operating an electromagnetic clutch assembly includes energizing a field winding in a rotatable portion of an electromagnetic clutch assembly through an inductive coupling between the rotatable portion and an exciter winding in a stationary portion of the electromagnetic clutch assembly. A magnetic field is generated from the field winding that urges engagement or disengagement between a clutch body of the rotatable portion and an armature body of the stationary portion.

An example electromagnetic clutch assembly includes a rotatable portion having an inductive winding and a field winding. A stationary portion has an exciter winding configured such that during rotation of the rotatable portion when electrical power is supplied to the exciter winding, electrical power is induced in the inductive winding and transferred to the field winding to generate a magnetic field to urge engagement or disengagement between the rotatable portion and the stationary portion.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
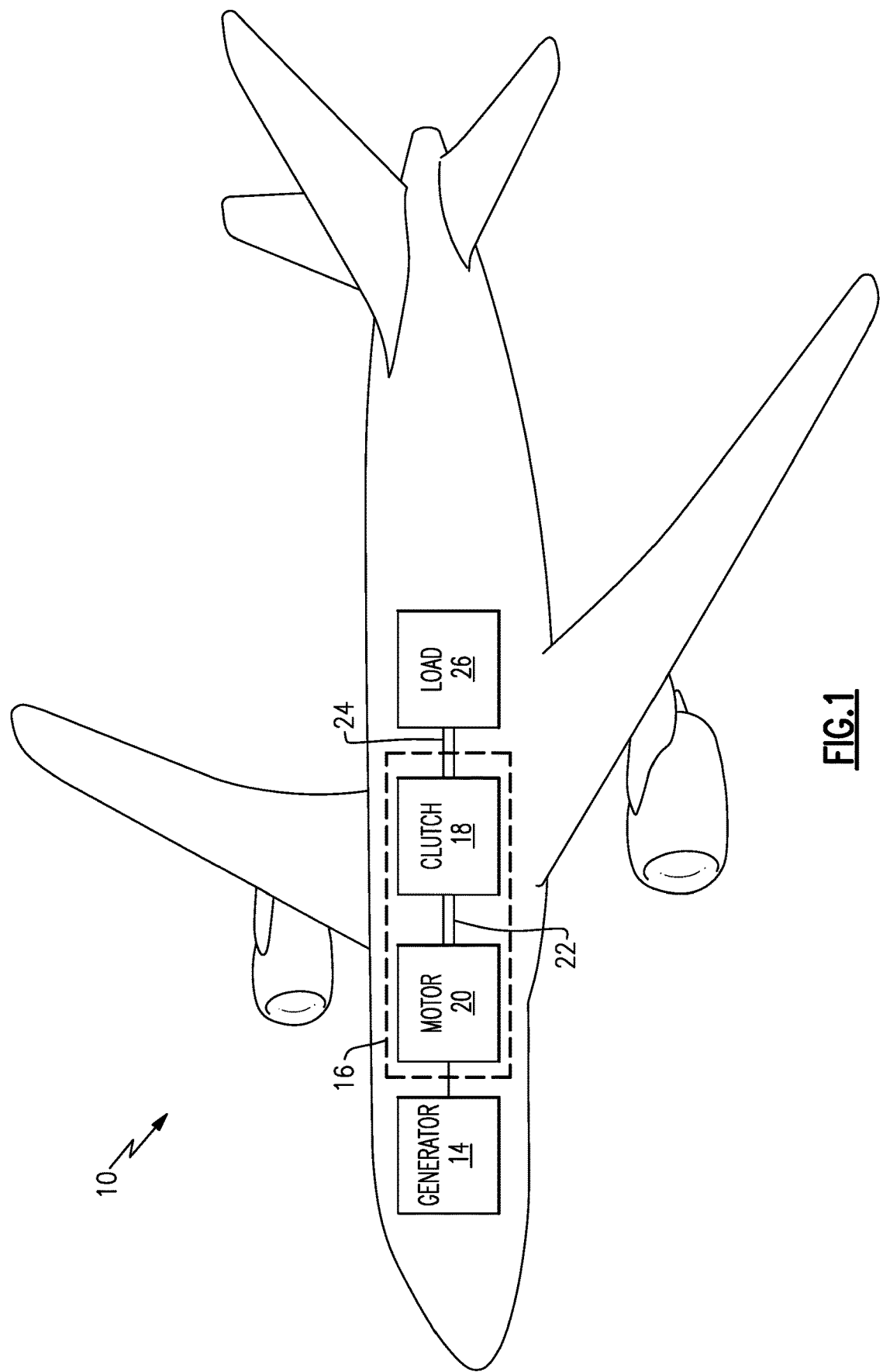
FIG. 1 is a schematic view of an aircraft that utilizes an actuator with an electromagnetic clutch.

FIG. 1 is a schematic view of an aircraft 10 that utilizes an electromagnetic actuator 16 that includes an electromagnetic clutch assembly 18. The actuator 16 also includes a motor 20 that drives rotation of a drive shaft 22. The electromagnetic clutch assembly 18 controls whether the drive shaft 22 is coupled to a load shaft 24 that drives a load 26.

The electromagnetic actuator 16 could be used for a variety of aircraft 10 features, such as braking, primary flight controls (e.g., aileron control, rudder control, etc.), landing gear operation, etc.

Figure 2:
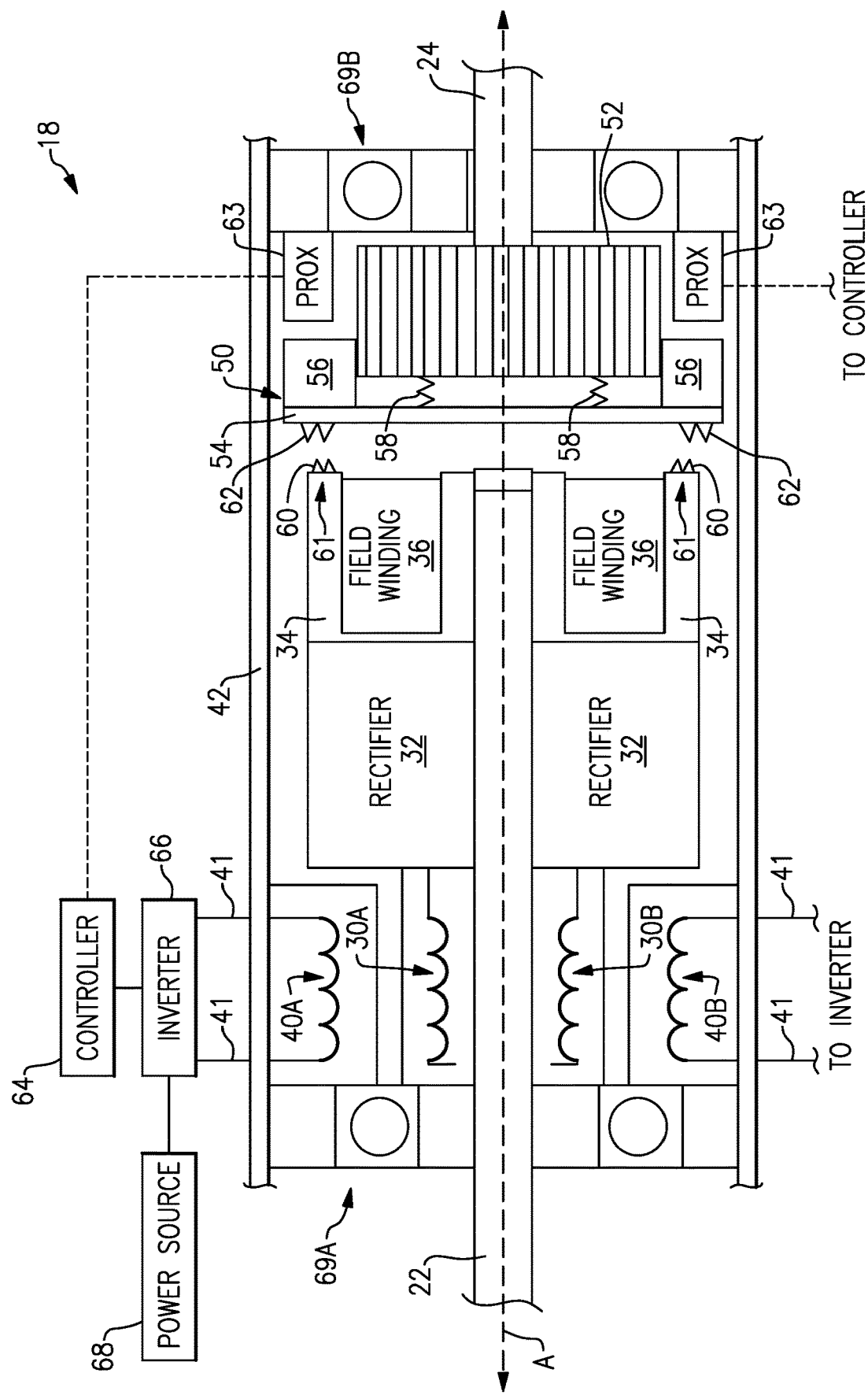
FIG. 2 is a schematic view of an example electromagnetic clutch assembly that may be used in the aircraft of FIG. 1.

FIG. 2 is a schematic view of an example electromagnetic clutch assembly 18 that may be used in the aircraft of FIG. 1. The electromagnetic clutch assembly 18 includes a rotatable portion and a stationary portion. The rotatable portion includes at least one inductive winding 30, a rectifier 32, a clutch body 34, and a field winding 36 that is at least partially disposed within the clutch body 34. The rotatable portion is rotatable about a central longitudinal axis A. The stationary portion includes at least one exciter winding 40 and a clutch housing 42.

The at least one exciter winding 40 is inductively coupled to the rotatable portion, and is operable to energize the field winding 36. The field winding 36, when energized, is operable to provide a magnetic field that causes engagement or disengagement between the clutch body 34 and an armature body 50.

The at least one exciter winding 40, which is stationary, and the at least one inductive winding 30, which is rotatable, are inductively coupled or "field-coupled." As used herein, two windings being "inductively coupled" means that that current in one of the windings induces a voltage in the other of the windings through electromagnetic induction. Thus, the at least one exciter winding 40 receives current from the power source 68 and induces current in the at least one inductive winding 30. This field-coupled arrangement avoids the need for brushes, and therefore avoids the reliability issues typically associated with using brushes.

The armature body 50 is coupled to a splined hub 52. The armature body 50 and splined hub 52 corotate with the load shaft 24. The armature body 50 includes an armature plate 54 and at least one splined armature member 56 that mates with the splined hub 52. In the example of FIG. 2, the armature body 50 is movable along the central longitudinal axis A with respect to the splined hub 52 to engage or disengage from the clutch body 34.

At least one spring 58 provides a bias force to the armature plate 54. In the example of FIG. 2, the spring(s) 58 are tension springs that provides a bias force that biases the armature plate 54 away from the clutch body 34 (a "power off—disengaged" configuration). The magnetic field from the at least one field winding 36 resists the bias force and causes the armature body 50 to engage the clutch body 34.

In another example, the spring(s) 58 are compression springs that provides a bias force that biases the armature body 50 towards the clutch body 34 (a "power off—engaged" configuration), and the magnetic field from the at least one field winding 36 causes the armature body 50 to disengage from the clutch body 34.

In the example of FIG. 2, the at least one spring 58 is mounted to the splined hub 52 and the armature plate 54. In another example, the at least one spring 58 could be mounted on an opposite side of the armature plate 54, and could connect the armature plate 54 to the clutch body 34.

In the example of FIG. 2, the clutch body 34 comprises a plurality of teeth 60 on a face 61 of the clutch body 34 that are operable to engage teeth 62 of the armature body 50. In one example, instead of having teeth 60, at least one of the face 61 of the clutch body 34 and the armature plate 54 have a high friction surface for engaging the face 61 with the armature plate 54. As used herein, a "high friction" surface is one having a higher coefficient of friction than the base substrate on which the high friction surface is situated (e.g., face 61 having a higher coefficient of friction than the portion of the clutch body 34 behind the face 61).

At least one proximity sensor 63 is configured to measure axial displacement of the armature body 50 along the longitudinal axis A. A controller 64 is operable to verify whether the clutch body 34 and armature body 50 are engaged or disengaged based on feedback from the at least one proximity sensor 63.

The controller 64 is operable to utilize pulse width modulation (PWM) to power the at least one exciter winding 40. In particular, the controller operates an inverter 66 to convert DC from a power source 68 to AC for energizing the at least one exciter winding 40 through leads 41 that extend outside of the clutch housing 42. In one example, the controller 64 operates the inverter 66 based on feedback from the at least one proximity sensor 63 (e.g., adjusting strength of the magnetic field from field winding(s) 36 based on an axial position of the armature body 50). The sensor 63 also enables the controller 64 to perform its own testing of the electromagnetic clutch assembly 18. The power source 68 could be powered by the generator 14 in FIG. 1, for example.

Bearings 69A enable rotation of the drive shaft 22 relative to the clutch housing 42, and bearings 69B similarly enable rotation of the load shaft 24 relative to the clutch housing 42.

In the example of FIG. 2, the at least one exciter winding 40 induces alternating current (AC) in the at least one inductive winding 30. The rectifier 32 rectifies the AC and provides DC to the at least one field winding 36. In the example of FIG. 2, there are two exciter windings 40A-B that induce current on the two inductive windings 30A-B. Other quantities of windings could be used, however, such as one or more than two exciter windings 40, and one or more than two inductive windings 30, and more than one field winding 36.

Figure 3:
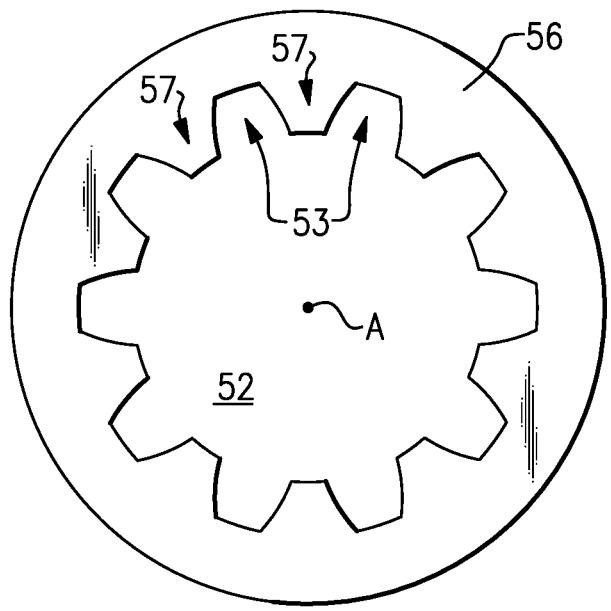
FIG. 3 is a schematic view of an interface between an armature body and a splined hub in the electromagnetic clutch assembly of FIG. 2.

FIG. 3 is a schematic view of an interface between the splined armature member 56 and the splined hub 52. Referring now to FIG. 3 with continued reference to FIG. 2, the splined hub 52 includes a plurality of splined teeth 53 disposed along an outer diameter of the splined hub 52, and the splined armature member 56 includes a plurality of splined teeth 57 disposed along an inner diameter of the splined armature member 56. The splined teeth 53 of the splined hub 52 engage the splined teeth 57 of the splined armature member 56. Both of the splined hub 52 and splined armature member 56 rotate about the central longitudinal axis A when the clutch body 34 and armature body 50 are engaged.

Figure 4:
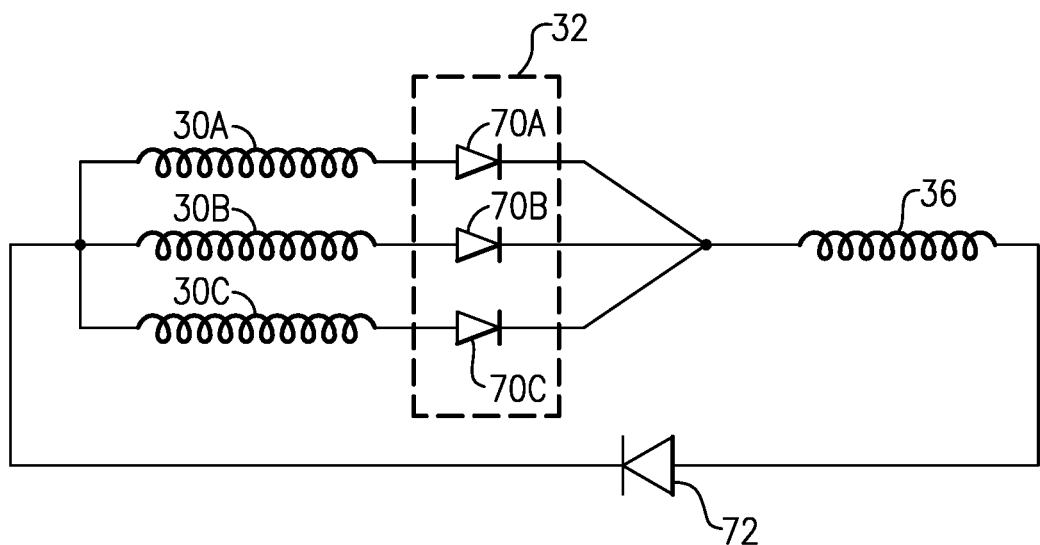
FIG. 4 is a schematic view of an example rectifier for the electromagnetic clutch assembly of FIG. 2.

FIG. 4 is a schematic view of an example implementation of the rectifier 32. In the example of FIG. 4, the at least one inductive winding 30 includes a plurality of inductive windings 30A-C, each corresponding to a phase of electrical current, and the rectifier 32 includes a respective diode 70A-C that rectifies current from its respective inductive winding 30A-C. A return diode 72 is also included.

Figure 5:
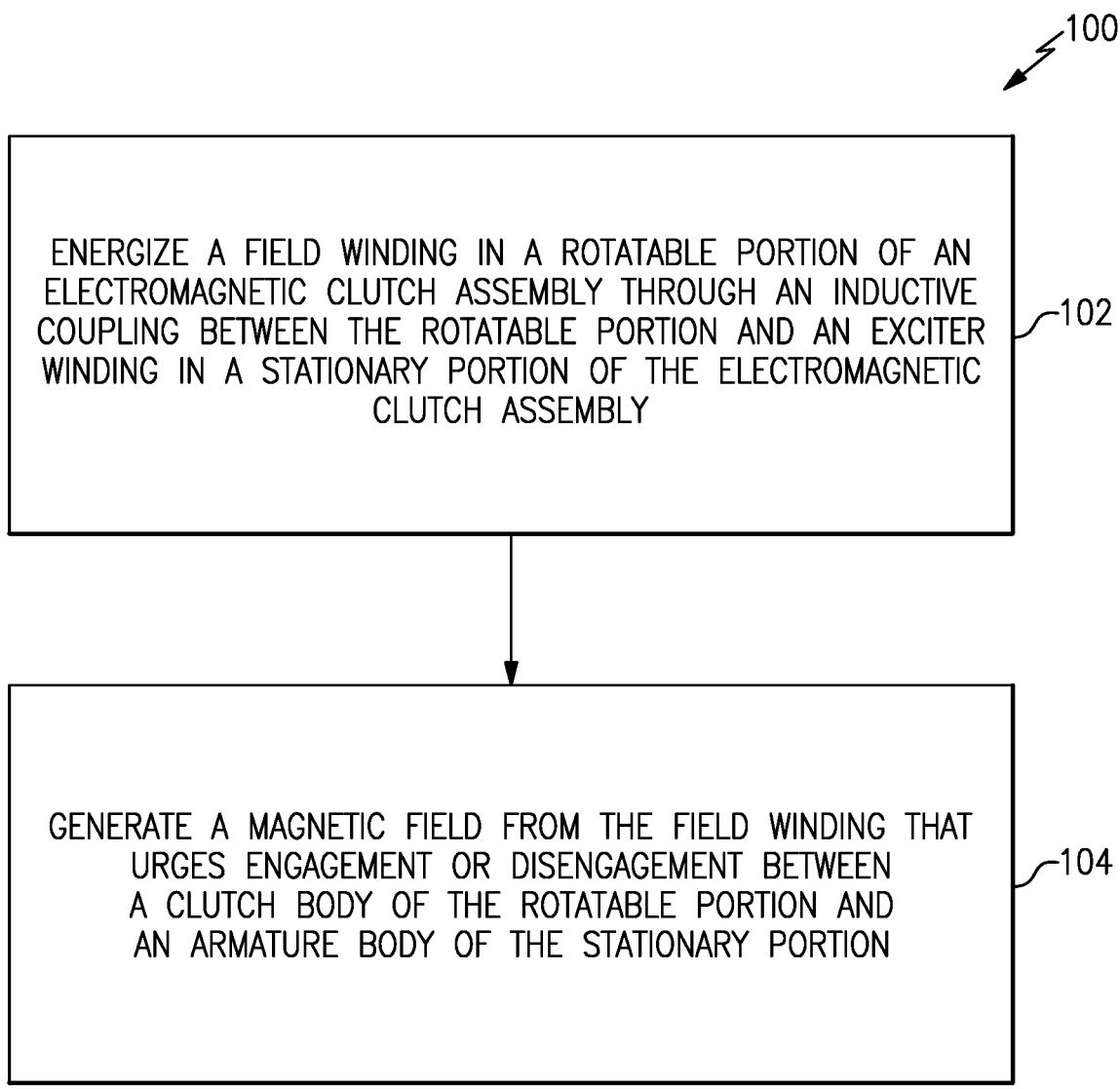
FIG. 5 is a flowchart representative of an example method of operating an electromagnetic clutch assembly.

FIG. 5 is a flowchart 100 representative of an example method of operating the electromagnetic clutch assembly 18. The method includes energizing field winding 36 in the rotatable portion of the electromagnetic clutch assembly 18 through an inductive coupling between the rotatable portion and an exciter winding 40 in the stationary portion of the electromagnetic clutch assembly 18 (block 102). A magnetic field is generated from the field winding 36 that urges engagement or disengagement between the clutch body 34 of the rotatable portion and the armature body 50 of the stationary portion (block 104).

In one example, energizing the field winding 36 includes inducing current in the inductive winding 30 of the rotatable portion, rectifying the induced current using rectifier 32, and providing the rectified current to the field winding 36. In another example, the rectifier 32 and inductive winding 30 are omitted, and the exciter winding 40 induces current in the field winding 36.

Although FIG. 2 illustrates the clutch body 34 as being axially stationary while the armature body 50 is movable along the central longitudinal axis A, in another example the clutch body 34 is axially movable along the central longitudinal axis A in addition to or as an alternative to the armature body 50 being axially movable.

The electromagnetic clutch assembly 18 discussed herein avoids the brushed configuration of prior art electromagnetic clutches, and therefore improves reliability. The electromagnetic clutch assembly 18 also expands potential uses for electronic actuators to certain aerospace applications, for which the reliability of traditional electromagnetic clutches that use contact brushes would not be sufficient.

Although example embodiments have been disclosed, a worker of ordinary skill in this art would recognize that certain modifications would come within the scope of this disclosure. For that reason, the following claims should be studied to determine the scope and content of this disclosure.

What is claimed is:

1. An electromagnetic clutch assembly comprising:
    a rotatable portion comprising an inductive winding, a field winding, a rectifier that connects the inductive winding to the field winding, and a clutch body; and
    a stationary portion comprising:
        an inverter configured to convert direct current (DC) from a power source to alternating current (AC); and
        an exciter winding connected to the output of the inverter, the exciter winding operable to receive the AC from the inverter and induce AC in the inductive winding in a brushless configuration;
    wherein the rectifier is configured to rectify AC from the inductive winding to DC for the field winding; and
    wherein the field winding is operable, when energized by the inductive winding, to provide a magnetic field that causes engagement or disengagement between the clutch body and an armature body.

2. The electromagnetic clutch assembly of claim 1, wherein:
    the stationary portion comprises a clutch housing;
    the rotatable portion is at least partially disposed within the clutch housing;
    the power source is outside of the clutch housing; and
    the exciter winding comprises leads that connect to the power source outside of the clutch housing via the inverter.

3. The electromagnetic clutch assembly of claim 1, wherein the rectifier comprises a diode for each phase of the induced AC.

4. The electromagnetic clutch assembly of claim 1, comprising:
at least one spring that provides a bias force that biases the armature body away from the clutch body;
wherein the magnetic field resists said bias force and causes the armature body to engage the clutch body.

5. The electromagnetic clutch assembly of claim 1, comprising:
at least one spring that provides a bias force that biases the armature body towards the clutch body;
wherein the magnetic field resists said bias force and causes the armature body to disengage from the clutch body.

6. The electromagnetic clutch assembly of claim 1, wherein the clutch body comprises a plurality of teeth operable to engage teeth of the armature body.

7. The electromagnetic clutch assembly of claim 1, wherein at least one of the clutch body and the armature body comprise a high friction surface for engagement between the clutch body and the armature body.

8. The electromagnetic clutch assembly of claim 1, wherein the rotatable portion is rotatable about a longitudinal axis, and the armature body is movable along the longitudinal axis to engage or disengage from the clutch body.

9. The electromagnetic clutch assembly of claim 8, comprising:
a splined hub that interconnects the armature body to a load shaft, the splined hub comprising splined teeth that engage splined teeth of the armature body.

10. The electromagnetic clutch assembly of claim 8, comprising:
at least one proximity sensor configured to measure axial displacement of the armature body along the longitudinal axis; and
a controller operable to verify whether the clutch body and armature body are engaged or disengaged based on feedback from the at least one proximity sensor.

11. The electromagnetic clutch assembly of claim 10, wherein the controller is operable to utilize pulse width modulation to provide the AC in the exciter winding based on feedback from the at least one proximity sensor.

12. A method of operating an electromagnetic clutch assembly comprising:
providing alternating current (AC) in an exciter winding of a stationary portion of the electromagnetic clutch assembly;
inducing AC in an inductive winding of a rotatable portion of the electromagnetic clutch assembly through an inductive coupling between the exciter winding and inductive winding wherein said inducing AC in the inductive winding comprises performing pulse width modulation to provide an input signal that energizes the exciter winding through an inverter;
rectifying the induced AC in the inductive winding to direct current (DC) using a rectifier, and providing the DC to a field winding, the rectifier and field winding part of the rotatable portion; and
generating a magnetic field from the field winding that urges engagement or disengagement between a clutch body of the rotatable portion and an armature body of the stationary portion.

13. The method of claim 12, comprising:
providing a bias force from at least one spring that biases the armature body away from the clutch body;
utilizing the magnetic field to resist said bias force and cause the engagement between the clutch body and the armature body.

14. The method of claim 12, comprising:
providing a bias force from at least one spring that biases the armature body towards the clutch body;
utilizing the magnetic field to resist said bias force and cause disengagement between the clutch body and the armature body.

15. The method of claim 12, comprising:
detecting axial displacement of the armature body using a proximity sensor; and
performing said providing based on said detecting.

* * * * *